May 5, 1964

F. E. BROOKS 3,132,284

FLYBACK TRANSFORMERS

Filed Sept. 26, 1960

INVENTOR.
Forrest E. Brooks
BY
ATTORNEY 3,132,284

FLYBACK TRANSFORMERS

Forrest E. Brooks, Moorestown, N.J., assignor to Radio Corporation of America, a corporation of Delaware Filed Sept. 26, 1960, Ser. No. 58,324
2 Claims. (Cl. 315—27)

Figure 1:
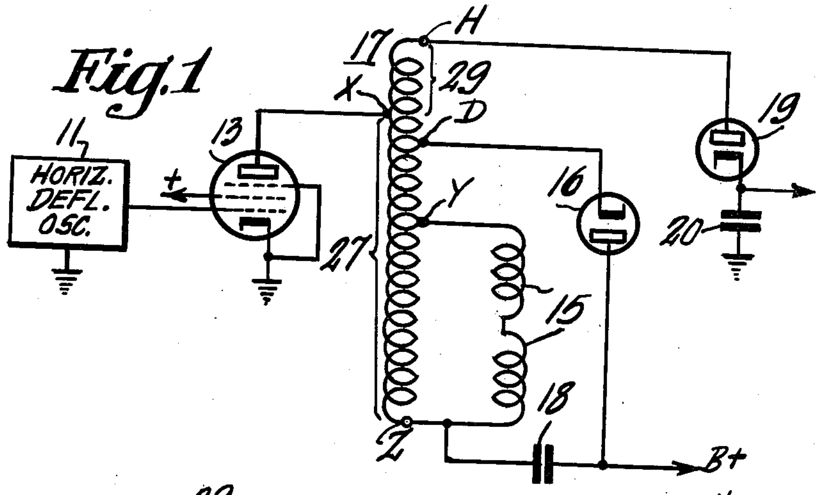

This invention relates generally to transformers, and particularly to novel and improved structure for transformers of the so-called flyback type.

In television receivers employing electromagnetic deflection of the scanning beam in the image reproducing kinescope, it is conventional to supply deflection currents at the line or horizontal rate to the appropriate coils of the kinescope's deflection yoke by means of a transformer. It is usual to employ autotransformer coupling between the horizontal deflection output tube and the horizontal coils of the deflection yoke. Ideally, the coupling system is arranged to supply a deflection current to the deflection coils which increases linearly at a relatively slow rate throughout the desired active scanning time, and then drops rapidly to its starting value during the brief retrace time. During the retrace time, when the magnetic fields associated with the deflection coils and coupling transformer are collapsing at a rapid rate, voltage pulses of relatively large magnitude are developed across the yoke and coupling transformer windings. Such a voltage pulse, referred to as a flyback pulse, corresponds to the first half cycle of a free oscillation of the deflection windings initiated when the driving tube is driven to cut off.

A damper tube is conventionally associated with the deflection system to substantially suppress the remaining cycles of oscillation, and to contribute a component to the yoke current in accordance with well known reaction scanning principles. It is also conventional to associate with the windings of the transformer that couples deflection energy to the yoke an additional step-up winding, from which stepped up versions of the flyback pulse developed during retrace time may be derived for rectification thereof to provide the high voltage required by the ultor or final accelerating electrode of the kinescope.

A significant problem associated with deflection systems of the above described type is the production of so-called "raster ringing," which may manifest itself in the alternation of dark and light vertical bars particularly on the lefthand side of the raster as the picture is normally viewed. The "ringing" problem may be traced to the initiation during retrace time of oscillations of a higher frequency than that represented by the desired flyback pulse half cycle of oscillation, the ringing frequency being determined by certain resonant conditions essentially inherently established in deflection systems of the described type.

It has been found that the high frequency ringing energy may be properly harnessed to give increased efficiency in both the deflecting and high voltage functions of the deflection apparatus. A major determinant of the ringing frequency has been observed to be the leakage inductance between the step-up winding provided for high voltage derivation purposes and the remaining windings of the deflection transformer. As described in U.S. Patent No. 2,825,849, issued on March 4, 1958, to P. M. Lufkin and C. C. Iden, by providing a critically determined spacing between the high voltage step-up winding and the remaining windings of the deflection transformer, the ringing frequency may be controlled in such manner as to phase the ringing waveform so that the ringing voltage combines with the flyback pulse to increase its amplitude, and secondly, combines with the damper tube current in a manner calculated to increase the amount of drive which may be applied to the system by the driving tube.

To appreciate how this principle of "tuning" the high voltage winding for ringing control purposes has been applied heretofore, one should now consider the conventional structure employed for a flyback transformer. In the usual flyback transformer, the primary and secondary windings employed for autotransformer coupling of the driving tube to the yoke coils comprise a continuous winding cylindrically arranged about a cylindrical coil form, in turn arranged about one leg of a rectangular apertured core. The core is usually formed by the juxtaposition of two C-shaped members of suitable magnetizable material (usually ferrite). The tertiary or high voltage winding is wound on the outside of the primary-secondary winding and concentric therewith. In accordance with the description in the Lufkin and Iden patent, the tertiary winding is spaced concentrically from the primary-secondary winding by a predetermined critical distance through use of a concentric insulating spacer. The amount of spacing between the tertiary and primary-secondary windings provided by the insulating spacer is chosen to adjust the leakage inductance therebetween to a value providing the optimum ringing frequency for high voltage and deflection efficiency.

As explained more fully hereinafter, the highest voltage associated with the transformer windings will be present at the outermost turn of the high voltage tertiary winding. This outermost turn of the tertiary winding is the closest turn to the opposing parallel leg of the rectangularly configured transformer core. As a result, the gradient across the air gap between the outermost turn of the tertiary winding and the opposing parallel leg of the core represents the highest voltage gradient encountered in the flyback transformer structure. The higher this gradient is, the greater is the danger of arc-over between the high voltage winding and the core at this point. To reduce this gradient, the air gap distance may be increased by eliminating the insulating spacer between tertiary and primary-secondary windings to bring the tertiary winding up closer to the primary-secondary windings; but, in view of the principles discussed above, the presence of the spacer is highly desirable for ringing tuning purposes whereby maximum deflection and high voltage efficiency may be approached. An alternative method of achieving a reduction of the noted gradient would be to increase the size of the ferrite core sections to increase the air gap distance. Such an expedient, however, has the drawback of increasing both the cost and size of the flyback transformer assembly.

The present invention is directed to means for reducing the noted voltage gradient without increasing the cost or size of the flyback transformer assembly, and without sacrificing the advantages of "tuning" the high voltage winding for ringing adjustment purposes. The present invention achieves this desirable result by eccentrically mounting the high voltage tertiary winding with respect to the primary-secondary windings of the flyback transformer. That is, the desired spacing between the high voltage tertiary winding and the primary-secondary windings is still established but in an asymmetrical manner, as by providing a shim between the respective windings solely externally of the core, the shim providing maximum spacing between the respective windings at points most remote from the opposing parallel leg of the core and minimum spacing therebetween at points most near to the opposing leg.

Thus, for a given core size, a higher maximum flyback pulse voltage may be permitted in a transformer arrangement with ringing tuning for maximum efficiency without danger of arc-over than can otherwise be permitted; conversely, where a given high voltage is required, smaller parts may be employed in providing a transformer arrangement properly tuned with respect to ringing and adequately safeguarded against arc-over than could otherwise be employed.

Accordingly, it is a primary object of the present invention to provide a novel and improved flyback transformer.

It is a further object of the present invention to provide a flyback transformer structure capable of meeting given high voltage and deflection requirements with smaller size parts without sacrifice of deflection or high voltage efficiency and without increase in danger of arc-over.

Similarly, it is an object of the present invention to provide a flyback transformer structure which, for given size parts, is capable of meeting greater high voltage requirements without sacrifice of deflection or high voltage efficiency and without increase in danger of arc-over.

Figures 2A, 2B:
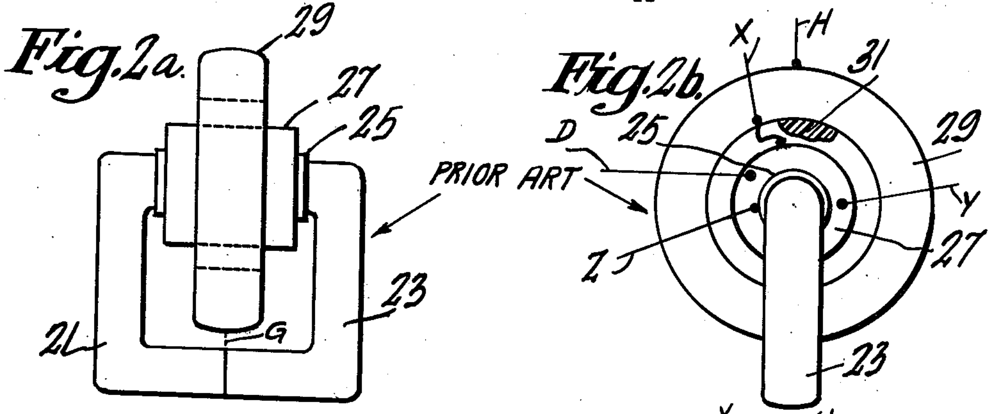
Figure 3A:
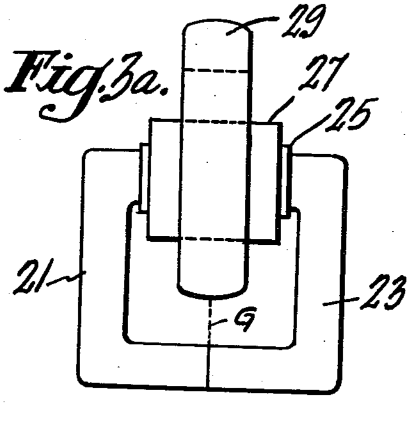
Figure 3B:
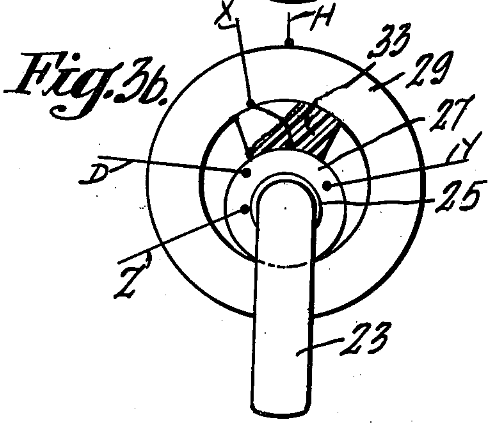

Other objects and advantages of the present invention will be readily appreciated by those skilled in the art upon a reading of the following detailed description and an inspection of the accompanying drawing in which:

FIGURE 1 illustrates, in partial schematic detail, the deflection and high voltage circuits of a television receiver, exemplifying the usual circuit application of a flyback transformer;

FIGURES 2*a* and 2*b* are respective front and end views of a flyback transformer constructed in accordance with the prior art principles;

FIGURES 3*a* and 3*b* are respective front and end views of a flyback transformer constructed in accordance with the principles of the present invention.

In FIGURE 1, a portion of the deflection circuitry of a typical television receiver is illustrated in schematic detail. The output of a suitably synchronized horizontal deflection oscillater 11 is applied to the control grid of a horizontal output yoke-driving tube 13. The output tube 13 supplies current of suitable sawtooth waveform to the horizontal windings 15 of a deflection yoke through the agency of a coupling transformer 17, providing coupling of a step-down autotransformer type between the driving tube and yoke. The anode of the output tube 13 is connected to a terminal X on the transformer 17. The winding extending from terminal X to the end terminal Z, i.e., winding 27, may be viewed as the primary winding of the transformer 17. The horizontal windings 15 of the deflection yoke are connected in series between the primary winding end terminal Z and a terminal Y, located between the terminals X and Z. The output tube 13 is effectively coupled across the entire winding 27, while the horizontal yoke windings 15 are coupled across the Y—Z portion of the winding 27, which portion may be viewed as the secondary winding of the transformer 17.

The sharp retrace stroke of the sawtooth current waveform delivered to the yoke windings 15 is achieved by cut-off of the horizontal output tube 13 during the desired retrace interval, causing a sudden collapse of the magnetic fields of the transformer 17 and of the yoke windings 15. This sudden collapse of fields results in the development across the transformer winding 27 of a flyback voltage pulse of relatively high magnitude. In order to obtain a source of high voltage for the ultor electrode of the receiver's kinescope, it is conventional practice to provide circuitry for rectifying the flyback pulses periodically developed in the transformer. In order that the flyback pulses supplied to the high voltage rectifier may be of the suitable high amplitude required, it is also customary to step up the amplitude of the pulses appearing across the winding 27, as by the provision of the illustrated high voltage tertiary winding 29 for the transformer 17. To obtain step-up autotransformer action, one end terminal of the tertiary winding 29 is connected to the high potential terminal X of the winding 27.

The stepped up flyback pulses appearing at the opposite end terminal H of the tertiary winding 29 are applied to the anode of the high voltage rectifier 19. The rectified pulse output appearing at the cathode of rectifier 19 is directly supplied to the kinescope ultor electrode. A filter capacitor 20 provided between the rectifier cathode and a point of reference potential serves to smooth out the D.C. ultor voltage; the filter capacitor 20 is usually integral with the kinescope itself when glass kinescopes are employed.

Also connected to the output transformer 17 at terminal D is the usual damper tube 16, serving to damp the oscillations initiated in the transformer by the cut-off of the output tube 13, the damping taking effect after the first half cycle of oscillations. The damper tube 16 also contributes a component to the sawtooth current flowing in the yoke windings 15 in accordance with well-known reaction scanning principles, and, in conjunction with the B-boost capacitor 18, which is in series with the damper tube 16 across a portion of the transformer winding 27, serves to develop an augmented power supply voltage (i.e. the so-called B-boost voltage) in accordance with well-known power recovery principles. The junction of capacitor 18 and the anode of damper tube 16 is returned to the receiver's source of B+ voltage.

In FIGURE 2*a*, the physical structure conventionally employed for the transformer 17 of the FIGURE 1 schematic is shown in a front view. The primary-secondary winding 27 of the transformer is mounted on and surrounds a cylindrical coil form 25 of a suitable insulating material. The high voltage tertiary winding 29 is mounted on and surrounds the primary-secondary winding 27. A cylindrical spacer sleeve 31 of insulating material physically separates the tertiary and primary-secondary windings. The coil form 25 is mounted on and surrounds one leg of an apertured rectangular core (of magnetizable material such as ferrite) formed by the juxtaposition of the open ends of two block C shaped core sections 21 and 23.

As the end view of FIGURE 2*b* illustrates clearly, the primary-secondary winding 27, the insulating spacer 31 and the tertiary winding 29 form concentrically disposed annuli.

A review of the circuit connections of FIGURE 1 leads one to appreciate that the innermost turns of the tertiary winding 29, being in closest proximity to the turns of the primary-secondary winding 27, constitute the end of the tertiary winding 29 to which terminal X of winding 27 should be connected. As a consequence, the end of tertiary winding 29 providing the high voltage terminal H constitute the outermost turns of winding 29. Thus, the points in the transformer of highest flyback pulse potential are at the outermost turns of the tertiary winding 29. Accordingly, the highest voltage gradient in the transformer exists between the outermost turn in the winding 29 and the leg of the transformer core which opposes, and is parallel to, the leg upon which the transformer windings are supported. The location of this highest voltage gradient is designated generally in FIGURE 2*a* by the dotted line labeled G.

Study of the end view of FIGURE 2*b* would suggest that this voltage gradient could be appreciably reduced by eliminating the spacer sleeve 31 and winding the high voltage tertiary winding 29 directly on the primary-secondary winding 27, whereby a greater separation would be provided between the outermost turns of tertiary winding 29 and the edge of the opposing core leg. However, the presence of the spacer sleeve 31 is highly desirable from the point of view of deflection and high voltage generation efficiency, as explained more fully in the previously mentioned Lufkin and Iden patent. By providing spacing between the windings 27 and 29 of a critically determined magnitude, the leakage inductance therebetween may be given a value providing an optimum frequency for the "ringing" currents associated with the deflection system. With the spacer 31 eliminated, and the tertiary winding 29 wound directly on the primary-secondary winding 27, the leakage inductance value usually is such as to preclude optimization of the ringing frequency.

However, the presence of the spacer 31, tending to bring the outermost turns of tertiary winding close to the opposing core leg, imposes certain limits on the minimum dimensions of the transformer core due to consideration of the problem of arc-over. If the voltage gradient across the space between the outermost turns of the tertiary winding 29 and the opposing core leg exceeds a given level, such as 75,000 volts per inch, the danger of the production of arcing across this space becomes significant. Thus, where it is desired to provide a flyback transformer capable of providing a flyback pulse output of a relatively high level, such as 23 kv., and yet retain the advantages of the above discussed ringing tuning, the construction principles of the prior art require use of a core with relatively large dimensions to avoid the above noted arc-over.

The present invention presents new flyback transformer construction principles whereby relatively high flyback pulse potentials, such as the above mentioned 23 kv., may be obtained in a transformer using ringing tuning for optimum efficiency with core dimensions of a much smaller magnitude than prior art transformer cores would require for the same arc-over protection. These new flyback transformer construction principles are illustrated in the front and end views of FIGURES 3*a* and 3*b*. As in the conventional transformer of FIGURES 2*a* and 2*b*, the primary-secondary winding 27 of the transformer is mounted on and surrounds a cylindrical coil form 25 of a suitable insulating material. Also, the high voltage tertiary winding 29 is mounted on and surrounds the primary-secondary winding 27; however, in place of the cylindrical spacer sleeve 31 of the prior art assembly, a shim 33 of suitable insulating material provides the desired physical spacing between windings 27 and 29, the shim 33 being located on only one side of the winding 27, i.e., the external side. The shim 33 provides maximum spacing between the respective windings 27 and 29 at points most remote from the opposing core leg, and minimum spacing therebetween at points most near to the opposing core leg. As the end view of FIGURE 3*b* clearly illustrates, the tertiary winding 29 forms an annulus accentrically disposed with respect to the annulus formed by the primary-secondary winding 27.

By suitable dimensioning of the shim 33, the same total spacing between the windings 27 and 29 may be obtained as would be provided by a cylindrical spacer sleeve of some given thickness. Thus, the shim 33 dimensions may be chosen to establish the desired value of leakage inductance between the windings 27 and 29 for optimization of the ringing frequency, whereby the efficiency advantages noted in the Lufkin and Iden patent may be obtained. However, in view of the eccentric position of the tertiary winding 29 with respect to the primary-secondary winding 27, a relatively long air gap is provided between the outermost turns of tertiary winding 29 and the opposing core leg; indeed, the same magnitude of air gap is obtained as would be obtained were spacing between the respective windings to be eliminated entirely and the tertiary winding 29 to be wound directly on the primary-secondary winding 27.

As a result, the voltage gradient across the air gap between the outermost turns of the tertiary winding 29 and the opposing core leg is substantially reduced, as compared with a transformer having the same net spacing between primary-secondary and tertiary windings but of conventional concentric construction. It is notable that this reduction of voltage gradient is achieved without need for altering the dimensions of the core. Cost and size savings are thus realizable through practice of the present invention.

What is claimed is:

1. A flyback transformer comprising in combination, a substantially rectangular, centrally apertured, magnetic core having first and second legs disposed along spaced parallel sides of a rectangle, a primary-secondary winding of annular shape surrounding said first leg and substantially concentric therewith, a tertiary winding of annular shape surrounding said primary-secondary winding in eccentric relationship therewith, and spacing means for maintaining said eccentric relationship between said windings and for establishing a spacing of predetermined magnitude between the outer surface of said annular primary-secondary winding and the inner surface of said annular tertiary winding, said spacing means comprising a non-magnetizable shim wedged between said primary-secondary winding outer surface and said tertiary winding inner surface in abutment solely with peripheral regions thereof remote from said second leg, the dimensions and location of said shim being such as to force the inner surface of said tertiary winding into abutment with the outer surface of said primary-secondary winding at the peripheral region thereof of greatest proximity to said second leg.

2. In a television receiver including a deflection yoke, rectifier means for developing a high voltage D.C. output, and a deflection waveform source, deflection transformer apparatus comprising the combination of: an apertured ferrite core having first and second legs disposed along spaced parallel sides of a rectangle, a first winding of annular shape surrounding said first core leg, said first winding having a pair of end terminals and an intermediate terminal, one of said end terminals being associated with the inner surface of said first annular winding and the other of said end terminals being associated with the outer surface of said annular winding; means for coupling said deflection waveform source across said pair of end terminals of said first winding; means for coupling said deflection yoke between said intermediate terminal and said one end terminal of said first winding; a second winding of annular shape surrounding said first winding, said second winding having a first end terminal associated with its inner surface and a second end terminal associated with its outer surface; means for galvanically connecting said first end terminal of said second winding to said other end terminal of said first winding whereby a substantially equipotential relationship is established between the inner surface of said second winding and the outer surface of said first winding; means for coupling said rectifier means to said second end terminal of said second winding; and means for providing an asymmetrically distributed spacing between the outer surface of said first annular winding and the inner surface of the surrounding second annular winding so as to enhance the efficiency of said high voltage development by increasing the value of leakage inductance existing between said first and second windings above that obtained by directly surrounding said first winding with said second winding without the interposition of said spacing providing means, said spacing providing means comprising a non-magnetizable shim wedged between said first winding outer surface and said second winding inner surface in abutment solely with peripheral regions thereof remote from said second core leg, the dimensions and location of said shim being such as to urge the inner surface of said second winding into abutment with the outer surface of said first winding at the peripheral region thereof of greatest proximity to said second core leg, whereby the asymmetry of spacing provided thereby is so oriented as to effect said leakage inductance value increase without decreasing the spacing between the outer surface of said second winding and said second core leg relative to that obtained by directly surrounding said first winding with said second winding without the interposition of said spacing providing means.

References Cited in the file of this patent

UNITED STATES PATENTS

| | | |
|---|---|---|
| 2,612,545 | Gray | Sept. 30, 1952 |
| 2,825,849 | Lufkin et al. | Mar. 4, 1958 |
| 2,924,746 | Claypool | Feb. 9, 1960 |
| 2,944,186 | Boekhorst et al. | July 5, 1960 |
| 2,956,250 | Harse | Oct. 11, 1960 |
| 2,992,359 | Thalner | July 11, 1961 |

FOREIGN PATENTS

| | | |
|---|---|---|
| 197,874 | Austria | May 27, 1958 |
| 867,606 | Great Britain | May 10, 1961 |